Patented Mar. 30, 1954

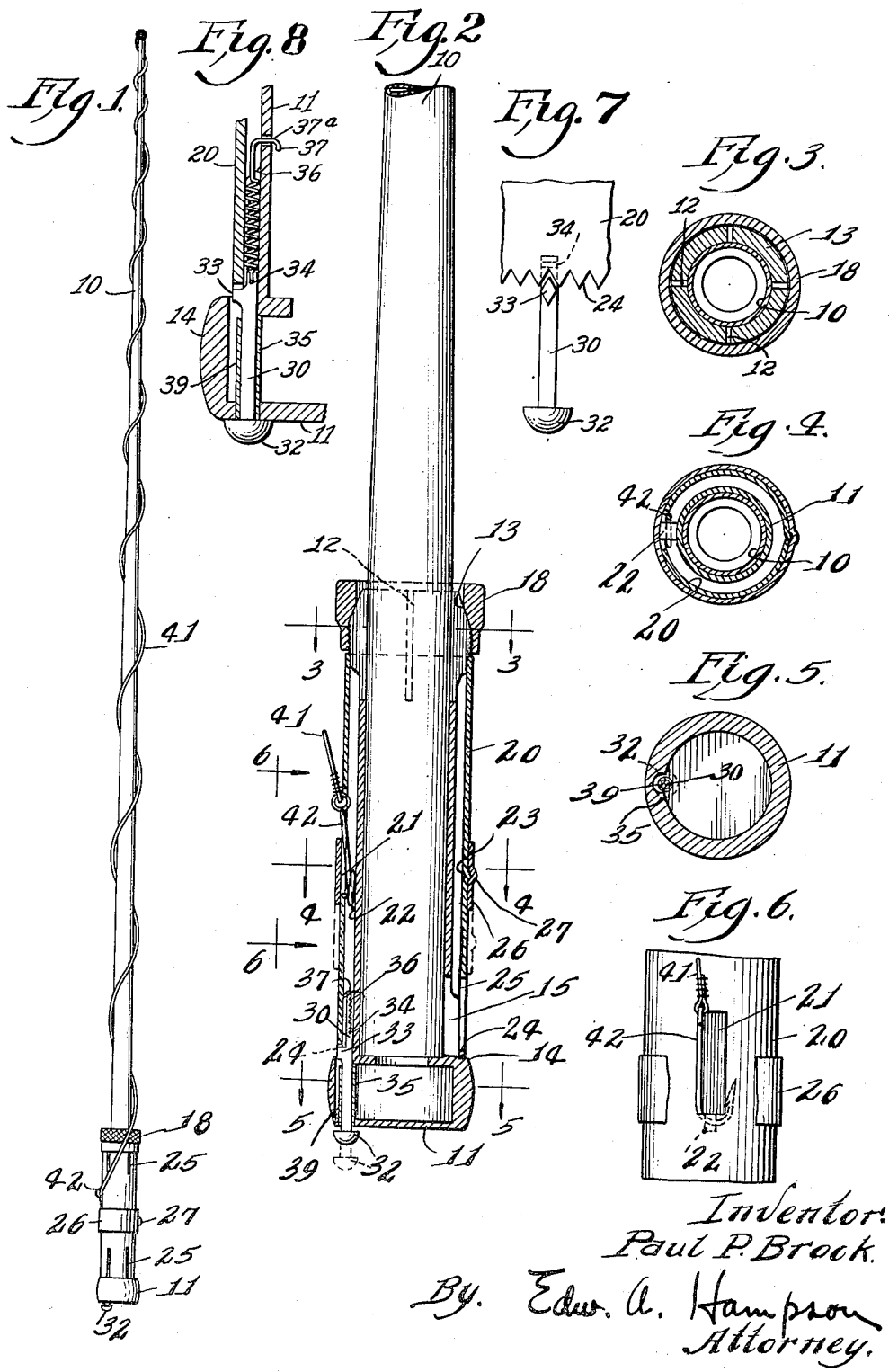

2,673,416

UNITED STATES PATENT OFFICE 2,673,416

FISHING ACCESSORY

Paul Peter Brock, Gillespie, Ill.

Application November 7, 1946, Serial No. 708,225

8 Claims. (Cl. 43—25.2)

This invention relates to an attachment device to be attached to and used in connection with the ordinary bamboo, cane or steel fishing pole, although not limited only to use in such connection since it may be used on any type of fishing pole.

The particular object of the invention hereof is the provision of an accessory to be attached to the base or butt of a fishing pole to provide means for securing the line tautly to the pole with the attached hook protected so that it will not comprise a hazard to cause any damage or injury. Other and minor objects of the invention will be apparent upon reading the following specification:

In the accompanying drawings,

Figure 1 is an elevation view illustrating a fishing pole with an attached fishing line secured by the accessory hereof attached to the butt end of the pole;

Figure 2 is an enlarged view of the butt end of the drawing of Figure 1, the accessory being shown in cross section;

Figure 3 is a sectional view taken on line 3—3 of Figure 2;

Figure 4 is a sectional view taken on line 4—4 of Figure 2;

Figure 5 is a sectional view taken on line 5—5 of Figure 2; and

Figure 6 is an enlarged elevation view of a portion of the fishing attachment hereof with a part broken away for clearness of illustration;

Figure 7 is an enlarged detail view illustrating the latch device;

Figure 8 is an enlarged detail view largely in section illustrating the relationship of the latch to the general structure.

Briefly described, the invention comprises a cylindrical sleeve-like member which may be secured to a butt end of a fishing pole and which is provided with a rotatable sleeve mounted thereon and in which sleeve there is an opening or pocket in which the hook on the end of the line may be protectively secured and retained. Upon suitable rotation of the rod within the rotatable sleeve, referred to, the line will be tautly wound around the pole, and there is provided a latch which engages the rotatable sleeve to prevent further relative rotation of the pole and the rotatable sleeve. In this connection, it is to be noted that rotation of the sleeve on the pole will not properly wind the line on the pole.

In the drawings there is illustrated an ordinary one-piece fishing pole 10 on the base of which there is mounted a socket member, which is of cylindrical shape, and which at its upper end is split or cut at 12 so that the upper end thereof is somewhat flexible, and in conjunction with clamping nut 18 provides for clamping of the socket member 11 to the pole 10.

At the uppermost end of socket member 11, exteriorly there is provided a taper 13 which, in conjunction with a substantialy similar taper on nut 18, provides a wedging action which, when nut 18 is screwed down on the attaching threads provided, causes the outer end portions of socket 11 to clampingly engage the pole 10, and thus socket 11 may be secured to the butt end of the pole 10. Socket 11 may also be secured to pole 10 by any other suitable means.

The socket member 11 peripherally is provided with spaced bearing portions, not numbered, on which is mounted a rotatable tube or sleeve 20 so that such is relatively rotatable with respect to socket member 11. The sleeve 20, about midway of its length, is provided with a cut-out or opening 21 which is adapted to receive a fish hook 42 attached to the end of fishing line 41, and at the lower edge of opening 21 there is provided a turned-in hook or tongue 22 under which the hook may be inserted to insure its being retained within opening 21. In the sleeve 20 and longitudinally thereof in the vicinity of cut-out 21, there is provided a slight bump or deformation 23 which, in conjunction with a mating or co-acting bump or deformation, in a ring 26 mounted on sleeve 20, provides means for securing the ring 26 in position to protectively secure hook 42 in the recess 21 of sleeve 20.

To prevent, on the one hand, relative rotation of socket member 11 and sleeve 20, and on the other hand to provide for relative rotation thereof, the lower end of sleeve 20 is provided with notches or serrations 24 (see Fig. 7) which cooperate with a latch member 30, hereinafter described, whereby such latch locks the members 11 and 20, preventing relative rotation thereof. In the enlarged bottom end 14 of socket member 11, there is provided a handle and latch member 30 which is mounted in a suitable bore provided in enlargement 14 of the socket. This handle and latch member 30 is provided with a head 32 and with a latch or stop member 33 which is suitably formed thereon. Above enlarged end portion 14 of the base of socket 11 there is provided a small opening or perforation 37a above the end of the bore in which the handle member 30 is mounted for securing an end 37 of a spring 36, the purpose of which will be described.

In the upper end of handle member 30 there is provided a small hole or opening 34 in which may be secured one end of a spring 36, the other end of which is the spring end 37 above referred to, which passes through the small opening 37a provided through the wall of socket 11 and with the end 37 bent over or otherwise secured therein. In accordance with the foregoing, it will be readily seen that the spring holds the handle and latch member 30 in retracted position within the enlarged base portion 14, and that when in such position the latch portion 33 of the handle and latch member 30 engages the serrations 24 in the lower end of sleeve 20 and thus relative rotation of socket 11 and sleeve 20 is prevented. In the enlarged portion 14 of the socket member and adjacent the bore in which is received the handle and latch member 30, there is provided a suitable key-way or slot 39 in which the latch projection 33 of handle member 30 may reciprocate, and thus it is evident that handle and latch member 30, by means of the said head portion 32, may be pulled outwardly to project from the enlarged sleeve portion 14, which also acts to disengage the latch member 33 from the serrations 24, and whereupon by a cranking action, or the like, exerted upon the handle and latch member 30, the sleeve 20 being held with one hand, the pole and the inner socket member 11 may be rotated relative to the outer sleeve 20. After rotation, as just described, upon release of the handle and latch member 30, its attached spring member 36 will retract the handle and latch member in the bore in which it is mounted and will cause re-engagement of latch 33 with notches or serrations 24. The lower portion of handle and latch member 30, below the latch member 33, is preferably provided with a loosely mounted sleeve 35, so that in cranking the handle and latch member 30 to rotate the pole 10 relative to the outer sleeve 20, the sleeve 35 may revolve relative to the handle member 30. In enlarged base portion 14 there is provided a key-way-like recess 39 opening to the bore in which latch plunger 30 operates. Latch 33 operates within this recess or key-way 39.

In the body of socket 11 and in the sleeve 20 there are provided openings which may be, respectively, elongated slots 15 and 25 but which, as will be well understood, may be of another shape, which slots serve the purpose of readily enabling one to wash sand, mud, or the like, out of the device should such in some manner get into the socket around the hole or between the socket member and the outer sleeve member. Preferably, these clean-out slots 15 and 25 are provided adjacent the butt or lower end of the device, but this is not mandatory, and so long as they will serve the purpose for which they are provided, that of enabling the device to be washed out while mounted on the pole, they may be provided anywhere along the length of the respective socket and sleeve members and in any desired number of such openings, all as is well understood.

Assuming that the fishing attachment hereof is mounted on and secured to the butt end of a cane pole, to which there has been secured an ordinary fishing line with attached hook, when the rod is not in use the line and hook are safely secured to the rod by the procedure as follows: The hook is placed in the opening 21 of sleeve 20 with the hooked portion preferably engaged under the tongue member 22, and ring 26 is projected into place to cover the opening 21, whereupon the co-acting securing portions 23 and 27 will hold the ring 26 in place protectively securing the hook within opening 21. Then holding sleeve 20, upon grasping the head 32 of the handle member 30, the handle and latch member may be withdrawn from the end of the socket member 11, and by means of this handle and latch member, the pole 10 and socket 11 may be revolved relative to the sleeve, and thus the hook, being secured in the opening 21 of sleeve 20, is relatively revolved about the axis of pole 10 and the line is spirally wound about the pole from the tip toward the butt. The winding of the line about the pole is continued until the line 41 is tautly wound about the pole, whereupon, upon release of the handle and latch member 30, its connected spring will retract the handle and latch member into the lower end of socket 11, causing the latch member 33 to engage serrations 24 in the lower end of sleeve 20 and thus lock the sleeve with respect to the socket member 11. It will be seen that by the procedure above the line is tautly wound about the pole, the hook is protectively encased so that it will not be a hazard or cause any damage, and the line is secured so that it cannot unwind and loosen with respect to the pole until by a deliberate act the handle and latch member 30 is again pulled out to release the latch 33, whereupon, by reverse operations, the line 41 is unwound and the hook may be released and the pole and line are then ready for use.

The invention hereof having above been described in detail, I claim:

1. An article of manufacture comprising in combination a tubular member, means attaching the tubular member to a rod insertable therein, a second tubular member journaled for rotation on the first tubular member, cooperating means on the tubular members preventing relative lengthwise movement thereof, means for mounting an independent member to the second tubular member, means securing said independent member to said second tubular member for rotation therewith, and releasable latch means carried by the first tubular member and latchably securing the second tubular member against rotation relative the first tubular member.

2. In combination with a fishing pole and connected line and hook, a fishing accessory comprising: a tubular socket mounted on the butt of the fishing pole, means securing the socket to the pole, means mounted on the socket and revolvable relative thereto, having a portion thereof spaced from the outer surface of the socket, cooperating means on the socket and revolvable means preventing relative movement lengthwise thereof, means securing the hook to the means revolvable relative the socket, a handle member mounted to the socket for revolving the socket relative to the means revolvable relative thereto, and a releasable latch means mounted on one of the relatively revolvable members and latching said one member to the other.

3. A device for mounting on the butt end of a fishing pole with attached fishing line and hook and comprising a socket member receiving the pole, means securing the socket member to the pole, shoulders on the socket members adjacent its respective ends, a tubular member mounted at its ends on said shoulders and rotatable about the axis of the socket member, the tubular member having an article receiving recess formed therein, a closure for said recess, means securing the closure in closing position relative the recess, handle means mounted on the socket member for rotating the socket member relative the tubular member and releasable means operative to prevent relative rotation of the socket and tubular members.

4. In combination with a fishing pole and a connected line and hook, a fishing accessory comprising: a tubular socket mountable on the butt of the fishing pole, means securing the socket to the pole, means mounted on the socket and revolvable relative thereto, means mounting the hook on and for securing the hook to the means revolvable relative the socket for rotation therewith, handle means mounted to the tubular socket for relatively revolving the socket and the means revolvable relative thereto and a releasable latch means latching the said relatively revolvable members, one to the other.

5. An accessory for mounting to a fishing pole adjacent the butt end thereof and comprising sleeve means rotatively mountable to the pole, means on the sleeve for mounting and for securing a fish hook thereto, means on the pole to position the sleeve adjacent its butt end restraining the sleeve from substantial longitudinal movement but permitting relative rotation and means securing the pole and sleeve against relative rotation.

6. In combination with a fishing pole, a rotatable sleeve mounted on and adjacent the butt end of the pole, means restraining substantial longitudinal movement of the sleeve, the sleeve being provided with means receiving a fish hook and securing the hook thereto, means for rotating the pole, mounted to the pole between the sleeve and the butt end of the pole and means operative to secure the pole against rotation relative the sleeve.

7. An article of manufacture comprising in combination a tubular socket member, means engaging the socket member to a rod inserted therein, a tubular member mounted on the socket member and journaled for rotation thereon, spaced shoulders on the socket member preventing relative movement of the tubular member lengthwise thereof, the tubular member being mounted at its ends to the spaced shoulders on the socket member and having an aperture in the tubular member, means associated with the aperture for retaining therein an independent member when inserted therein and latch means releasably securing the socket and the tubular member mounted thereon against relative rotation.

8. In combination with a fishing pole and connected line and hook, a fishing accessory comprising: a socket mounting on the butt of the fishing pole, means securing the socket to the pole, a tubular member mounted on the socket and revolvable relative thereto, spaced shoulders on the socket and between which the tubular member is mounted, preventing relative movement lengthwise of the tubular member on the socket, the tubular member at its ends being mounted to the spaced shoulders for rotation relative the socket, an annular member on the revoluble tubular member, the annular member encasing and securing thereto the hook, and releasable latch means latching the said relatively revolvable members one to the other and restraining rotation of the tubular member relative the pole.

PAUL PETER BROCK.

References Cited in the file of this patent

UNITED STATES PATENTS

| Number | Name | Date |
|---|---|---|
| 742,040 | Kurtz | Oct. 20, 1903 |
| 870,033 | Hildreth | Nov. 5, 1907 |
| 888,075 | Eshnaur | May 19, 1908 |
| 1,550,080 | Lehrritte | Aug. 18, 1925 |
| 1,662,983 | Pflueger | Mar. 20, 1928 |
| 1,785,027 | Gephart | Dec. 16, 1930 |
| 1,980,317 | Clark et al. | Nov. 13, 1934 |
| 2,131,819 | Russell | Oct. 4, 1938 |
| 2,144,122 | Pflueger | Jan. 17, 1939 |
| 2,285,888 | Benton | June 9, 1942 |
| 2,424,419 | Rosa | July 22, 1947 |
| 2,523,361 | Farnham | Sept. 26, 1950 |

FOREIGN PATENTS

| Number | Country | Date |
|---|---|---|
| 12,728 of 1933 | Australia | June 29, 1934 |
| 128,893 | Great Britain | July 3, 1919 |
| 577,615 | Great Britain | May 24, 1946 |